United States Patent
Klank et al.

(10) Patent No.: US 11,008,036 B2
(45) Date of Patent: May 18, 2021

(54) STEERING SYSTEM WITH AN ACTUATING DEVICE, AND USE OF THE STEERING SYSTEM WITH ACTUATING DEVICE

(71) Applicant: ZF Friedrichshafen AG, Friedrichshafen (DE)

(72) Inventors: Michael Klank, Osnabrück (DE); Jens Vortmeyer, Preussisch Oldendorf (DE); Hans-Jürgen Pfisterer, Osnabrück (DE); Adrian Riechmann, Osnabrück (DE); Christoph Anneken, Osnabrück (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 236 days.

(21) Appl. No.: 16/302,785

(22) PCT Filed: Apr. 27, 2017

(86) PCT No.: PCT/EP2017/060006
§ 371 (c)(1),
(2) Date: Nov. 19, 2018

(87) PCT Pub. No.: WO2017/202565
PCT Pub. Date: Nov. 30, 2017

(65) Prior Publication Data
US 2019/0092378 A1    Mar. 28, 2019

(30) Foreign Application Priority Data

May 25, 2016  (DE) ...................... 10 2016 209 160.3
Apr. 4, 2017  (DE) ...................... 10 2017 205 666.5

(51) Int. Cl.
*B62D 5/04*    (2006.01)
*B62D 7/14*    (2006.01)
(Continued)

(52) U.S. Cl.
CPC ............. *B62D 5/0445* (2013.01); *B62D 3/06* (2013.01); *B62D 5/0424* (2013.01); *B62D 7/146* (2013.01);
(Continued)

(58) Field of Classification Search
CPC ...... B62D 5/0424; B62D 5/0445; B62D 3/06; B62D 7/146
See application file for complete search history.

(56) References Cited

U.S. PATENT DOCUMENTS 7,064,468 B2    6/2006  Fujinaka
8,516,914 B2 *  8/2013  Osterlanger ........... B62D 17/00
                                                     74/89.39

(Continued)

FOREIGN PATENT DOCUMENTS

DE        602 04 965 T2    12/2005
DE    10 2012 018 952 A1    3/2014
(Continued)

OTHER PUBLICATIONS

"Vernier Permanent MagnetMotor Drives"; "Chapter 8" In: K.T. Chau: "Electric Vehicle Machines and Drives: Design, Analysis and Application", May 29, 2015, John Wiley & Sons, Singapore Pte. Ltd., Singapore.
(Continued)

*Primary Examiner* — Tony H Winner
(74) *Attorney, Agent, or Firm* — Finch & Maloney, PLLC; Michael J. Bujold

(57) ABSTRACT

A steering system with an actuating device (1), in particular a rear axle steering system, having a spindle drive (3) with a spindle (5) and a spindle nut (4) which is fitted into the housing (2) of the steering system in a positionally fixed but rotatable manner and is driven by an electric motor (9). The electric motor (9) is a vernier motor that drives the spindle
(Continued)

drive (3) and is integrated in the spindle drive (3). The actuating device (1) is used for a rear axle steering system of a motor vehicle.

5 Claims, 2 Drawing Sheets

(51) Int. Cl.
*B62D 3/06* (2006.01)
*B62D 7/06* (2006.01)
*F16H 25/20* (2006.01)

(52) U.S. Cl.
CPC ............... *B62D 7/06* (2013.01); *F16H 25/20* (2013.01); *F16H 2025/2096* (2013.01)

(56) References Cited

U.S. PATENT DOCUMENTS

| | | | | |
|---|---|---|---|---|
| 8,607,920 B2* | 12/2013 | Jungbecker | .......... | B62D 7/1581 180/445 |
| 8,943,916 B2* | 2/2015 | Osterlaenger | .......... | B60G 7/006 74/89.39 |
| 9,415,800 B2* | 8/2016 | Fujita | ................ | B62D 15/0225 |
| 9,469,335 B2* | 10/2016 | Sato | ................... | B62D 5/0403 |
| 9,550,517 B2* | 1/2017 | Fujii | ...................... | B62D 7/146 |
| 9,567,000 B2* | 2/2017 | Morinaga | ............... | F16H 37/12 |
| 9,643,644 B2* | 5/2017 | Fujita | .................. | B62D 5/0433 |
| 2002/0195293 A1* | 12/2002 | Will | ...................... | B62D 7/148 180/445 |
| 2003/0221897 A1* | 12/2003 | Taneda | .................. | B62D 7/148 180/445 |
| 2014/0042833 A1* | 2/2014 | Hiura | .................. | H02K 41/031 310/14 |
| 2016/0121922 A1* | 5/2016 | Fujita | .................. | B62D 5/0475 74/89.39 |

FOREIGN PATENT DOCUMENTS

| | | | | |
|---|---|---|---|---|
| DE | 102012018952 A1 * | 3/2014 | ............. | B62D 7/146 |
| DE | 10 2014 206 934 A1 | 10/2015 | | |
| JP | 2002-079947 A | 3/2002 | | |
| WO | 2012/059511 A2 | 5/2012 | | |

OTHER PUBLICATIONS

International Search Report Corresponding to PCT/EP2017/060006 dated Aug. 21, 2017.
Written Opinion Corresponding to PCT/EP2017/060006 dated Aug. 21, 2017.

* cited by examiner

STEERING SYSTEM WITH AN ACTUATING DEVICE, AND USE OF THE STEERING SYSTEM WITH ACTUATING DEVICE

This application is a National Stage completion of PCT/EP2017/060006 filed Apr. 27, 2017, which claims priority from German patent application serial no. 10 2017 205 666.5 filed Apr. 4, 2017 and German patent application serial no. 10 2016 209 160.3 filed May 25, 2016.

FIELD OF THE INVENTION

The invention relates to a steering system with an actuating device, which comprises a spindle with a spindle thread and a spindle nut with a nut thread that engages with the spindle thread. The invention also relates to the use of the actuating device.

BACKGROUND OF THE INVENTION

Steering systems with actuating devices having a threaded spindle for axial displacement are known in a variety of designs. In a first version according to JP 2002079947 A2 for steering the wheels on a front axle, a so-termed vernier motor is used, which by virtue of a special structure and the control of numerous coils produces a high torque while occupying little fitting space. This spiral drive is arranged at the end of a steering gear system, whereby the steering has a large axial extension and therefore takes up a lot of space.

The structure and advantages of a vernier electric motor are described in DE 60204965 T2 with various applications in mind.

SUMMARY OF THE INVENTION

Starting from the above prior art, the invention pursues the aim of further improving a steering system having an actuating device.

The invention embodies the characteristics specified in the independent claim. Advantageous design features emerge from the subordinate claims.

According to a first aspect of the invention, it is provided that the steering system, in particular a rear axle steering system, is made with an actuating device that comprises a spindle drive having a spindle, and a spindle nut which is in a fixed position but mounted to rotate in the housing of the steering system. The invention is characterized by an electric motor in the form of a vernier motor, coupled as the drive input to the spindle drive.

By means of the electric rotary drive the spindle nut is displaced in rotation and co-operates with the outer thread of the spindle in such manner that, finally, the spindle is displaced axially—and according to the rotational direction the spindle is moved axially in one direction or the other.

The electric motor (E-motor) is preferably in the form of a brushless vernier electric motor. Such E-motors are highly efficient electric motors which, compared with conventional electric motors, have better volume efficiency. While occupying little volume, a vernier motor can produce a higher torque than a conventional E-motor with a correspondingly larger volume. In other words an E-motor can be made smaller and at the same time have higher power. To put it differently, for the same size as a conventional E-motor a comparatively much higher power can be obtained. Thus, for the actuating device and the steering system, especially a rear axle steering system, a very compact steering system can be produced so that the fitting space required for the steering system, in particular a rear axle steering system, can be significantly reduced.

The vernier motor is not only smaller than a comparable electric motor. It is also lighter and has greater power efficiency than a comparable conventional E-motor with sufficient torque to drive the spindle drive of a steering system, particularly in a rear axle steering system with a spindle that can move axially relative to a housing. Namely, due to the design the weight of the magnets can be reduced. Consequently smaller amounts of rare earth metals have to be used to make the magnets, and this substantially reduces the cost of a vernier motor compared with a comparable E-motor with the same power.

In a first embodiment the vernier motor is arranged with its longitudinal axis parallel to the longitudinal axis of the spindle and spindle nut. In this case the spindle nut can be driven by the vernier motor by way of a gear system, preferably by means of a traction drive with drive elements or by means of a gear drive, in particular a planetary gearset. Of particular advantage is the smaller fitting space required by the vernier motor and thus by the actuating device and steering system as a whole when the E-motor is arranged axis-parallel to the housing of the actuating device.

In a preferred further embodiment the vernier motor is arranged coaxially with the spindle. In contrast to the previously mentioned axis-parallel arrangement, a coaxial structure can provide a still more compact form of the actuating device and steering system. It is true that this principle is already known from conventional hollow-shaft motors in steering systems. However, here too the special vernier motor enables a very substantial reduction of the fitting space. Preferably the vernier motor has a stator rotationally fixed relative to the housing, with a rotor, mounted to rotate inside the stator, coupled to the spindle nut. In this type of E-motor, magnets are arranged outside the stator, but compared with conventional E-motors these are much smaller so that the fitting space occupied by the motor as a whole is reduced. For that reason the outer diameter of the actuating device is also reduced. In this embodiment there is direct coupling to the spindle nut.

In a further preferred embodiment the spindle nut is driven by the rotor indirectly by means of an interposed gearset. In other words, the coupling between the rotor and the spindle nut is formed by gearing. The gearing, for example in the form of a gear drive, has sufficient working space within the rotor thanks to the structure of the vernier motor. By virtue of the gear ratio made possible by the gear drive, a broader range of applications can be covered in the case of actuating devices having a compact electric linear drive.

According to another aspect of the invention, it is provided that the steering system and its actuating device are used as the actuator of a rear axle steering system or in a rear axle steering system of a motor vehicle. Due to the lower energy demand of the vernier electric motor resulting from its already mentioned higher power density, less energy is drawn from the on-board electrical system of the motor vehicle for adjusting the rear wheels than when an actuating device with a conventional electric motor is used. The smaller energy uptake during such an adjustment also results in less operating noise when using the actuator. Furthermore, the weight reduction has economical consequences for vehicles with rear axle steering.

The above-mentioned drive system with a vernier motor is also suitable for other applications, for example in window-raisers in vehicle doors or similar positioning drives.

Here too, a compact, more energy-efficient drive that produces a higher torque is needed.

BRIEF DESCRIPTION OF THE DRAWING

An example embodiment of the invention is illustrated in the drawings and will be described in greater detail below so that further features and/or advantages can emerge from the description and/or the drawings, in which.

DETAILED DESCRIPTION OF THE PREFERRED EMBODIMENTS

Figure 1:
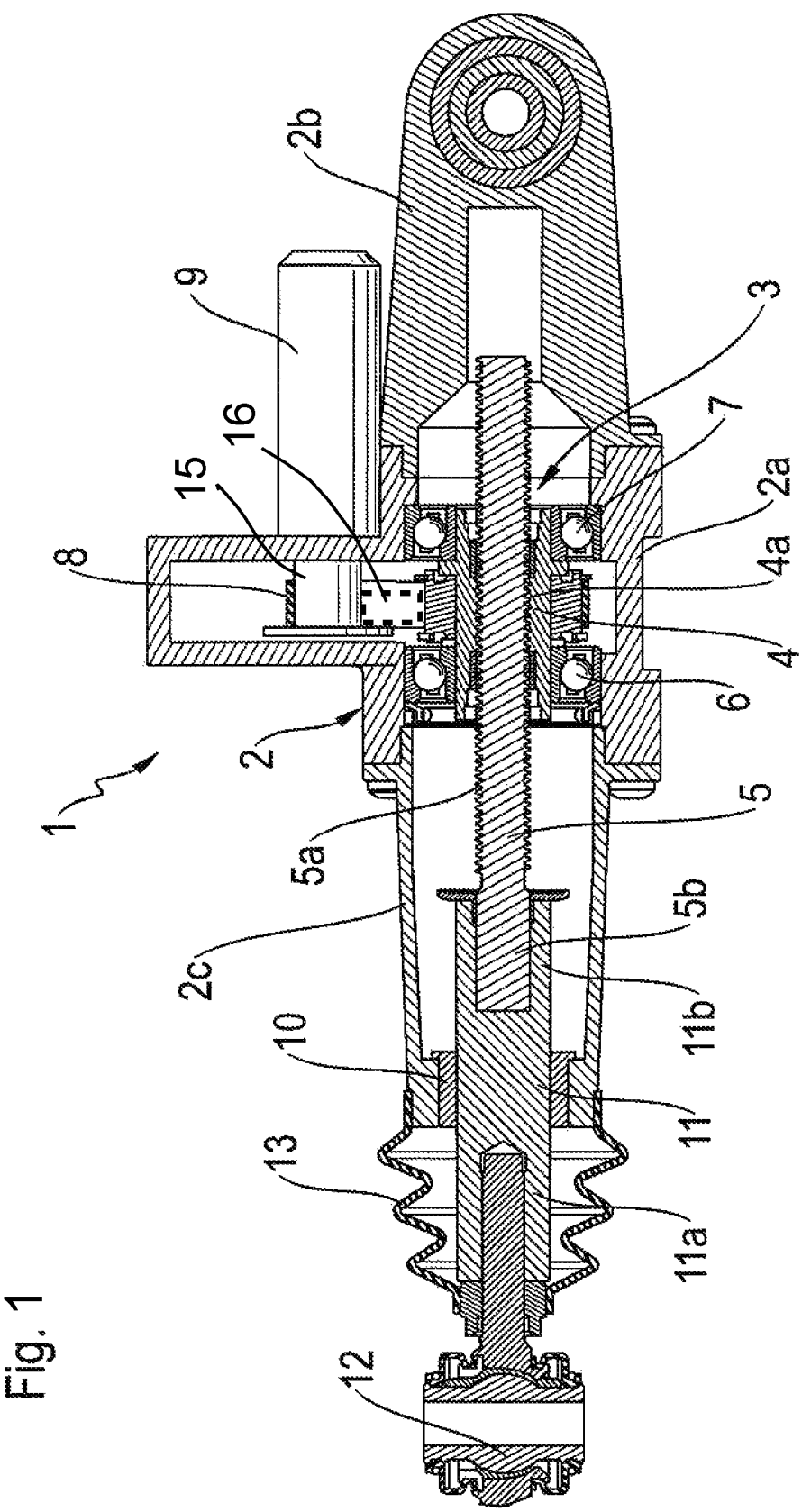
FIG. 1 shows an actuating device having a compact electric motor drive.
Figure 2:
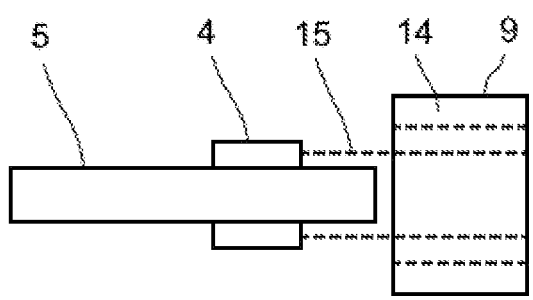
FIG. 2 diagrammatically shows an embodiment of the actuating device having a spindle drive and electric motor drive.

FIG. 1 shows a longitudinal section of the structure of a simple electric actuator 1 (also referred to as an actuating device), i.e. one that acts on only one wheel, for a rear axle steering system of a motor vehicle. The actuator 1 has a multi-component housing 2 in which is arranged a spindle drive 3 comprising a spindle nut 4 and a spindle 5 that engages with the spindle nut 4 and can be displaced axially. The spindle 5 has a spindle thread or outer thread 5a and the nut has a nut thread or inner thread 4a, which are in the form of a movement thread, preferably a trapezoid thread. The spindle nut 4, which is supported rotatably in the housing 2 by two roller bearings 6 and 7, is driven via a belt drive 8 by an electric motor 9. As an alternative, the electric motor 9 has a rotor 15 which indirectly drives the spindle nut 4 by means of interposed gearing 16 in the form of a drive gear and which is diagrammatically shown with dashed lines in FIG. 1. The housing 2 comprises three housing components, namely a central housing component 2a in which the spindle nut 4 is fitted, a component 2b on the vehicle side via which the actuator 1 is articulated to the vehicle, and a component 2c on the wheel side at the end of which a slide bearing 10 is arranged. The spindle 5 has an end side 5b which is connected in a rotationally and laterally fixed manner to a screw-on shaft 11. The screw-on shaft 11 has a slide bearing section (not indexed) that passes through the slide bearing 10. At the end 11a of the screw-on shaft 11 that projects out of the housing 2c, a joint 12 is attached via a pivot bolt 12a, which joint can be connected by way of a steering rod (not shown) such as a track rod, or even connected directly, to a steerable rear wheel of the motor vehicle, which wheel is mounted by means of a wheel carrier on the body of the vehicle in a rotatable and steerable manner. The outer part 11a of the screw-on shaft 11 that projects out of the housing 2c is sealed by a flexible seal in the form of a bellows 13, which encloses on one side the housing 2c and on the other side the pivot bolt 12a. The slide bearing 10 and the slide bearing section of the screw-on shaft 11 that can move in the slide bearing 10 are provided with anti-rotation means (not shown here). FIG. 1 shows how small the fitting space required is thanks to the electric motor. Thanks to that, the actuating device or actuator has a slim overall shape. FIG. 2 diagrammatically shows the vernier motor 9 arranged coaxially with the spindle 5. In this case, the vernier motor 9 has a stator 14 that is rotationally fixed, and the rotor 15 is coupled to the spindle nut 4 and mounted to rotate inside the stator 14.

INDEXES

1 Actuator
2 Housing
2a Central housing component
2b Housing component on the vehicle side
2c Housing component on the wheel side
3 Spindle drive
4 Spindle nut
4a Nut thread
5 Spindle
5a Spindle thread
5b Spindle end
6 Roller bearing
7 Roller bearing
8 Belt drive
9 Electric motor
11 Slide bearing
11 Screw-on shaft
11a Outer part
11b Inner part
12 Joint
12a Pivot bolt
13 Bellows

The invention claimed is:

1. A rear axle steering system of a vehicle in combination with an actuating device, the actuating device comprising:
a spindle drive having a spindle and a spindle nut, the spindle nut is rotatable about a longitudinal axis and axially fixed relative to a housing, the spindle nut having first and second axially opposite ends, the first end of the spindle nut being supported within the housing by a first bearing and the second end of the spindle nut being supported within the housing by a second bearing;
a vernier motor having a rotor that defines a rotational axis, the rotor having either a traction drive or a gear drive that is drivingly coupled to the spindle nut axially between the first and the second bearings so that rotation of the vernier motor rotationally drives the spindle nut about the longitudinal axis;
the spindle nut having a threading that mates with threading of the spindle such that rotation of the spindle nut drives the spindle axially along the longitudinal axis of the spindle nut relative to the housing;
a first end of the spindle being connected to a shaft such that the spindle and the shaft are rotationally and laterally fixed relative to each other, the shaft being supported by a slide bearing such that the shaft is only movable along the longitudinal axis relative to the slide bearing, and the slide bearing is supported by the housing such that the shaft is movable along the longitudinal axis relative to the housing; and
the shaft being connectable to a wheel of the vehicle, and an axial side of the housing opposite the shaft is articulated to the vehicle.

2. The actuating device according to claim 1, wherein the spindle drive and the vernier motor are arranged such that the longitudinal axis and the rotational axis are coaxial.

3. The steering system according to claim 2, wherein the vernier motor has a stator rotationally fixed relative to the housing, and a rotor, fitted to rotate inside the stator, is coupled to the spindle nut.

4. The steering system according to claim 3, wherein the rotor is coupled to the spindle nut by a gear system.

5. The actuating device according to claim 1, wherein the spindle drive and the vernier motor are arranged such that the longitudinal axis and the rotational axis are parallel to each other.

* * * * *